US012122565B1

(12) United States Patent
Bley

(10) Patent No.: US 12,122,565 B1
(45) Date of Patent: Oct. 22, 2024

(54) DISPLAY READY CORRUGATED PACKAGING WITH MULTIPLE WALL CONSTRUCTION

(71) Applicant: Packaging Corporation of America, Lake Forest, IL (US)

(72) Inventor: Robert W. Bley, Long Valley, NJ (US)

( * ) Notice: Subject to any disclaimer, the term of this patent is extended or adjusted under 35 U.S.C. 154(b) by 0 days.

(21) Appl. No.: 17/983,053

(22) Filed: Nov. 8, 2022

Related U.S. Application Data

(60) Provisional application No. 63/276,961, filed on Nov. 8, 2021.

(51) Int. Cl.

| | |
|---|---|
| ***B65D 5/06*** | (2006.01) |
| ***B31B 50/26*** | (2017.01) |
| ***B65D 5/42*** | (2006.01) |
| *B31B 100/00* | (2017.01) |
| *B31B 110/35* | (2017.01) |
| *B31B 120/30* | (2017.01) |
| *B31B 120/70* | (2017.01) |

(52) U.S. Cl.
CPC .............. *B65D 5/06* (2013.01); *B31B 50/262* (2017.08); *B65D 5/4204* (2013.01); *B31B 2100/00* (2017.08); *B31B 2110/35* (2017.08); *B31B 2120/302* (2017.08); *B31B 2120/70* (2017.08)

(58) Field of Classification Search
CPC ........ B65D 5/06; B65D 5/4204; B65D 5/542; B65D 5/0227; B65D 5/443; B65D 5/4608; B65D 5/16; B65D 5/002; B65D 5/001; B65D 5/0045; B65D 5/0281; B65D 5/5405
USPC ....... 229/240, 103, 174, 918, 122, 143, 164, 229/170, 173, 190, 191, 919; 206/769, 206/772
See application file for complete search history.

(56) References Cited

U.S. PATENT DOCUMENTS

| | | | | |
|---|---|---|---|---|
| 5,413,276 A * | 5/1995 | Sheffer | B65D 5/48014 229/917 |
| 8,887,985 B2 * | 11/2014 | Laughman | B65D 5/48 206/774 |
| 9,022,276 B2 * | 5/2015 | Little | B65D 5/542 229/120.17 |
| 9,290,294 B2 * | 3/2016 | Laughman | B65D 5/542 |
| 11,072,457 B2 * | 7/2021 | Gressel | B65D 5/5405 |
| 11,299,313 B2 * | 4/2022 | Lawrence | B31B 50/25 |
| 11,396,398 B2 * | 7/2022 | Gressel | B65D 5/4608 |
| 11,472,595 B1 * | 10/2022 | Rhodes | A47B 47/06 |

* cited by examiner

*Primary Examiner* — Christopher R Demeree
(74) *Attorney, Agent, or Firm* — Klarquist Sparkman, LLP

(57) ABSTRACT

A blank for use in forming a container, such as a corrugated fiberboard container, can include a plurality of side walls that provide improved structural integrity, including improved stacking strength. Method of forming the plurality of side walls include positioning a first side wall adjacent a second side wall, and positioning a third side wall adjacent the second side wall.

15 Claims, 12 Drawing Sheets

DISPLAY READY CORRUGATED PACKAGING WITH MULTIPLE WALL CONSTRUCTION

CROSS REFERENCE TO RELATED APPLICATION

This application claims the benefit of U.S. Provisional Application No. 63/276,961, filed Nov. 8, 2021. The prior application is incorporated herein by reference in its entirety.

FIELD

This disclosure relates generally to containers, including containers for use as delivery and display packages, and methods of manufacturing such containers.

BACKGROUND

Containers that are capable of the dual purpose of shipping and displaying products can be advantageous. However, conventional containers of this type often suffer from structural and/or functional shortcomings. As such, improvements in such containers are desirable.

SUMMARY

The foregoing and other objects, features, and advantages of the invention will become more apparent from the following detailed description, which proceeds with reference to the accompanying figures.

DETAILED DESCRIPTION

General Considerations

Figure 1:
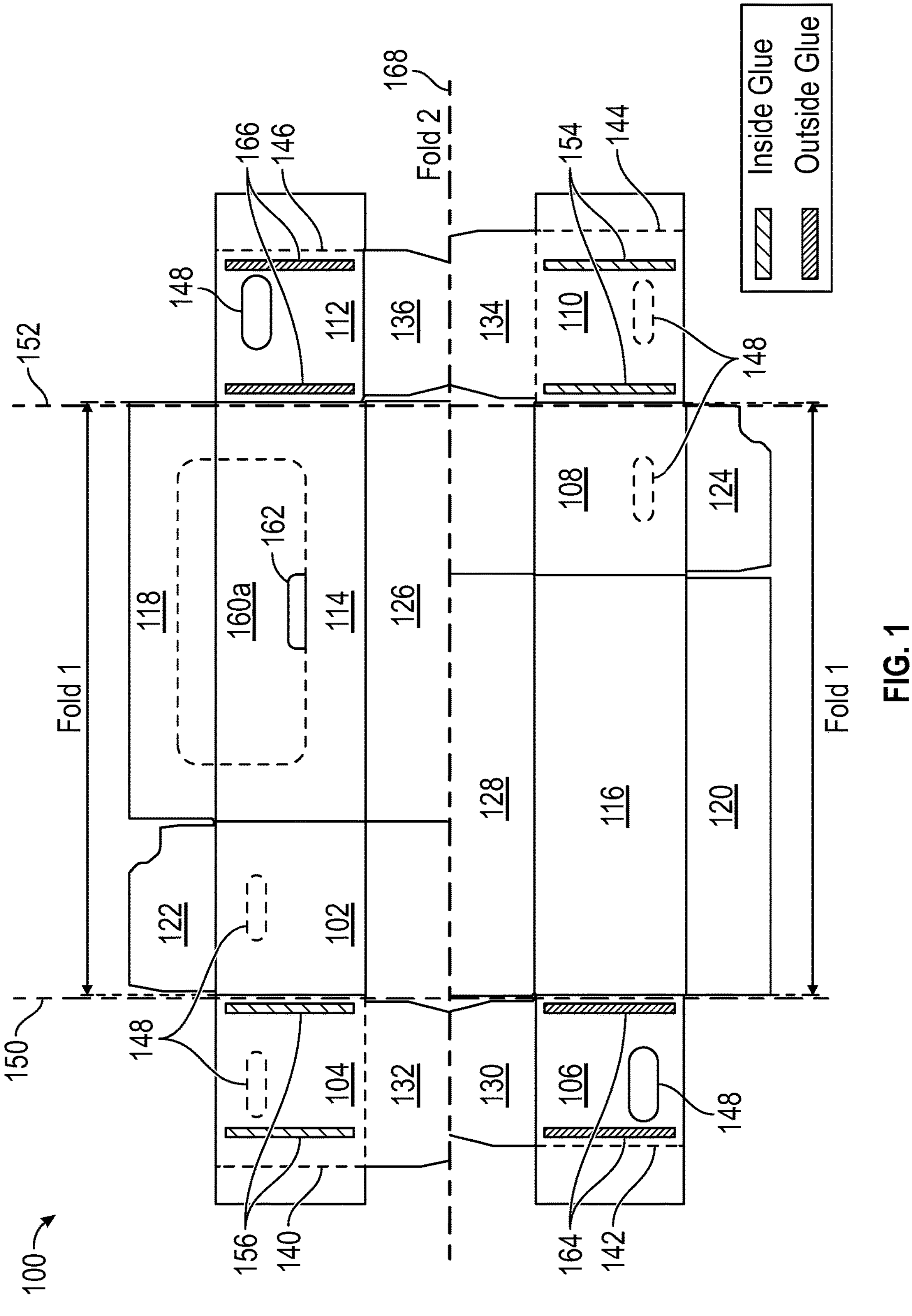
FIG. 1 illustrates a first side of an exemplary blank for constructing a container.

As used in this application the singular forms “a,” “an,” and “the” include the plural forms unless the context clearly dictates otherwise. Additionally, the term “includes” means “comprises.” Furthermore, as used herein, the term “and/or” means any one item or combination of items in the phrase. In addition, the term “exemplary” means serving as a non-limiting example, instance, or illustration. As used herein, the terms “e.g.,” and “for example,” introduce a list of one or more non-limiting embodiments, examples, instances, and/or illustrations.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like “provide,” “produce,” “determine,” and “select” to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

As used herein, the term “container” refers to an article that is capable of holding one or more products or other physical articles. As used herein, the term “corrugated paperboard box” refers to a box formed from any of a variety of heavy paper-like materials, including, for example, cardstock, corrugated fiberboard, and/or paperboard.

As used herein, the term “blank” refers to a flat sheet of material that is formed into a container, such as a flat sheet of corrugated paperboard. As used herein, “corrugated fiberboard” refers to a material having a fluted corrugated sheet and one or two flat linerboards. The linerboards described herein can be made of a variety of materials and can have any desirable color or construction. For example, linerboards can have, without limitation and in whole or in part, a construction that includes an inside and/or outside face that is white, kraft, mottled, colored, and/or preprinted with a graphic or other desired surface ornamentation.

As used herein, the term “flat-formed” refers to an article that is manufactured from one or more flat pieces, such as a blank, that are manipulated into a different shape, such as by folding. As used herein, the term “hingedly coupled” refers to any manner of engagement between a first part of a blank relative to a second part of the blank which allows the first part to travel relative to the second part, such as by one or more fold lines, one or more cut lines, and/or some combination thereof. In some embodiments, the first part does not fully disengage from the second part during construction of the container. In other embodiments, the first part can be fully disengaged (i.e., separated) from the second part during construction of the container.

As used herein, the term “fold lines” refers to any creasing, perforations, or the like that facilitates folding of a wall or other portion of a blank, including, for example, one or more perforations, slit-scores, slit/crease combinations, curved scores, wide-crush zones, embossing, and/or any combination of the same.

As used herein, the term "cut line" refers to type of fold line in which an area that includes a cut that extends at least partially through the blank to facilitate folding, tearing, and/or some other structural advantage. Cut lines can be straight, curved, or some other shape, and can include perforation lines in which the cut is not continuous along the length of the cut line (i.e., a perforated line is a cut line that is discontinuous).

As used herein, the terms "graphic" and "graphical element" refer to any visual design elements including, but not limited to, photos, logos, text, illustrations, instructions, advertisements, lines, shapes, patterns, and/or images of various kinds, as well as any combinations of these elements. The terms graphic and graphical element are not intended to be limiting and can incorporate any number of contiguous or non-contiguous visual features. A graphic can be applied to a surface of a material, such as a blank, in any suitable manner. For example, a graphic can be provided on a surface by printing, lamination, adhesive application, coating application (e.g., paint), embossing, and/or any other means.

For the purposes of this disclosure, relative terms such as "vertical", "horizontal", "top", "bottom", "front", "back", "end" and "sides" may be used. It should be understood, however, that the terms are used only for purposes of description, and are not intended to be used as limitations. Accordingly, the orientation of an object or a combination of objects may change without altering the scope of the invention.

As used herein the term "KDF" or "KDF blank" refers to a knocked-down flat blank, which is a flat condition in which the box is generally shipped for use, prior to forming a box from the blank.

Exemplary Containers and Methods of Constructing the Same

Figure 2:
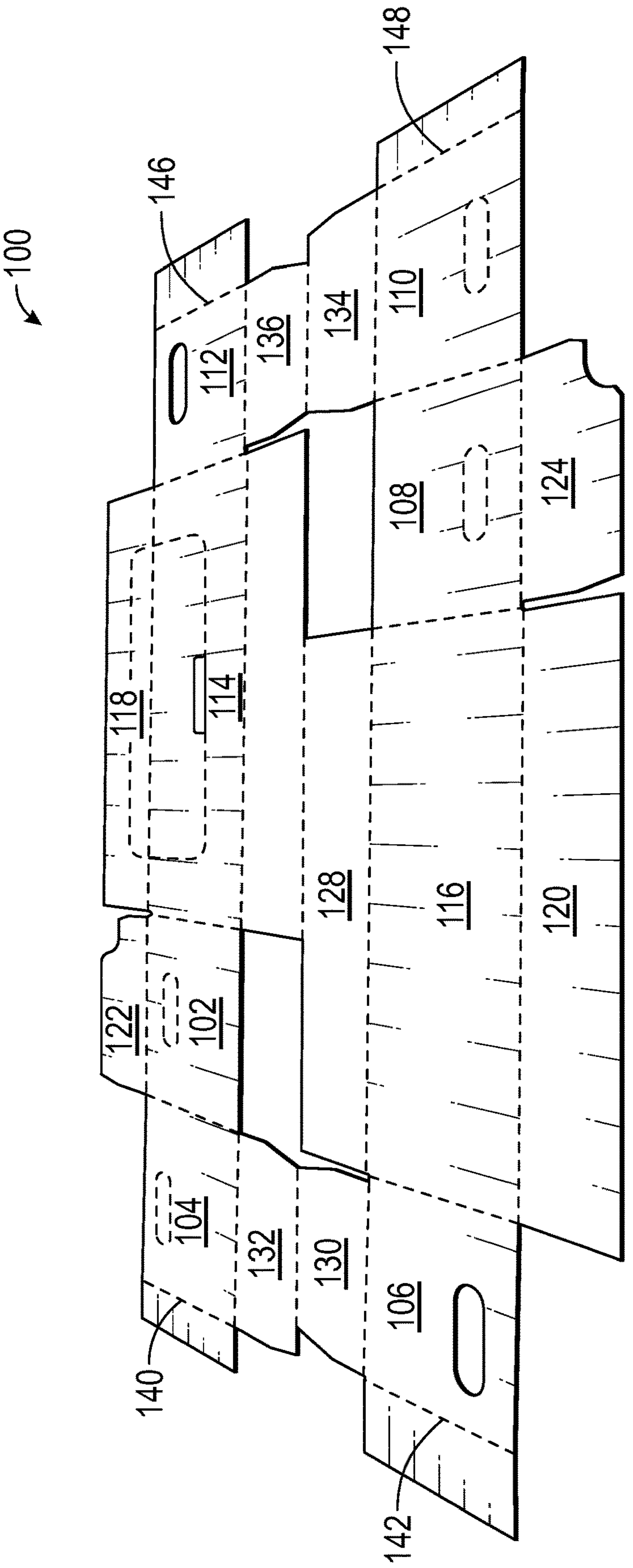
FIG. 2 illustrates a first side of an exemplary blank for constructing a container.

FIGS. 1 and 2 illustrates an exemplary embodiment of a blank 100 that can be formed into a container, such as a corrugated paperboard box. A first side of the blank (i.e., a top side) faces up and a second side (i.e., a bottom side) faces down.

As discussed below in more detail, blank 100 can be constructed into a container that comprises a plurality of side walls that provide improved structural integrity, including improved stacking strength. Blank 100 has a first right side wall 102, a second right side wall 104, a third right side wall 106, a first left side wall 108, a second left side wall 110, and a third left side wall 112.

Blank 100 also includes a front wall 114, a rear wall 116, a front side top wall 118, a rear side top wall 120, a right side top wall 122, and a left side top wall 124. Blank also include front side bottom wall 126, a rear side bottom wall, 128, one or more right side bottom walls (e.g., 130, 132) and one or more left side bottom walls (e.g., 134, 136).

One or more internal flaps can extend from one or more of the side walls. For example, as shown in FIGS. 1 and 2, a first flap 140 extends from second right side wall 104, a second flap 142 extends from third right side wall 106. A third flap 144 extends from second left side wall 110, and a fourth flap 146 extends from third left side wall 112. The first and second flaps have a width and a height. The height can be the same or different from the adjacent side wall from which the flap extends. Preferably, however, the height is substantially the same so that the flap can provide vertical structural support. A height is substantially the same if it can support a load placed on top of the container, either by having generally the same height as the side wall or by having underlying structures (e.g., bottom flaps) that effectively increase the height of the flap to substantially the same as the side wall.

One or more cut lines can be provided to facilitate the removal of portions of the blank, either during or after construction. For example, as shown in FIG. 1, a plurality of handle portions 148 can be formed from cut lines and the handle portions 148 can be removed to define an opening into the container for handling the container. Handle portions 148 can be placed so that after folding, the two or more handle portions 148 overlap with one another.

In addition, cut lines can be provided elsewhere along the blank to facilitate removal of other portions of the blank, such as one or more removable panels 160*a* and 160*b*. Removable panels 160*a*. 160*b* can be removed together (e.g., they are hingedly coupled together) or separately to provide a display opening that extends from a front wall structure (e.g., front wall 114) to a top wall structure (e.g., front side top wall 118). One or more additional cut lines can also be provided to facilitate the removal of these removable panels, such as handle cutout 162.

Although shown on a "front" wall, it should be understood that the removable portion can be located on any other wall. In addition, as discussed above, the directional terms (e.g., front) used herein are for purposes of description only, and are not intended to be used as limitations since the orientation of the object can vary.

In constructing the container, blank 100 can be folded about first fold lines 150, 152. One or more adhesives can be applied to the blank to secure facing surfaces together. In some embodiments, exemplary locations of adhesives are illustrated; however, it should be understood that the location of adhesives can vary, so long as the desired end result is achieved.

Figure 3:
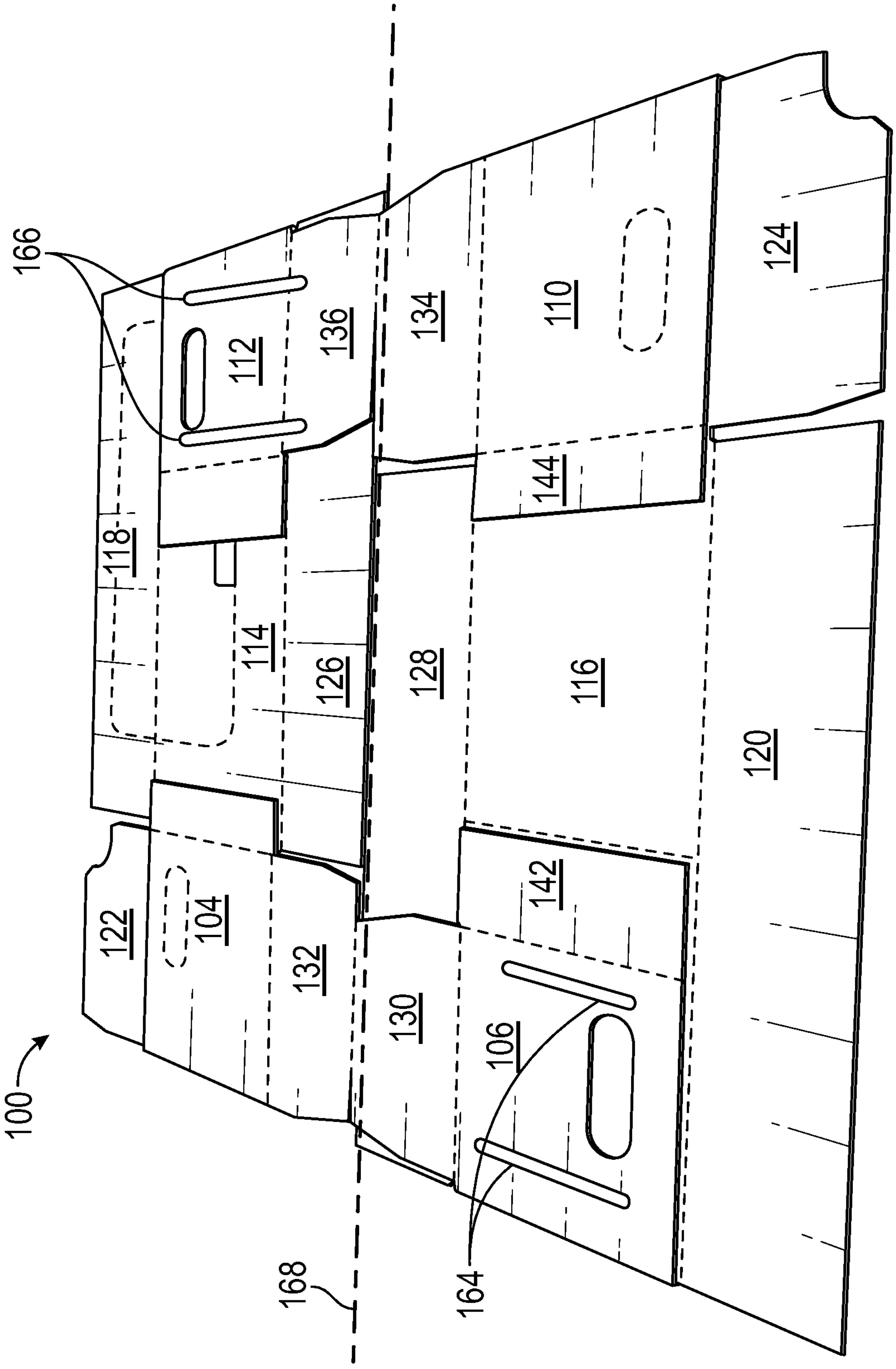
FIG. 3 illustrates an exemplary blank folded in an intermediate stage of constructing a KDF blank.

For example, glue strips 154, 156 can be applied to the blank 100 to secure facing surfaces together in the vicinity of a respective glue strip after the blank 100 is folded about the first fold lines 150, 152 into a first folded configuration (e.g., FIG. 3).

FIG. 3 illustrates the blank 100 folded about the first fold lines 150, 152. Referring to FIG. 3, portions of the second side (e.g., original bottom side) are now one top. Adhesives can be applied to the blank to secure facing surfaces together. For example, glue strips 164, 166 can be applied to the blank 100 to secure facing surfaces together in the vicinity of a respective glue strip when the blank 100 is folded about a second fold line 168.

Figure 4:
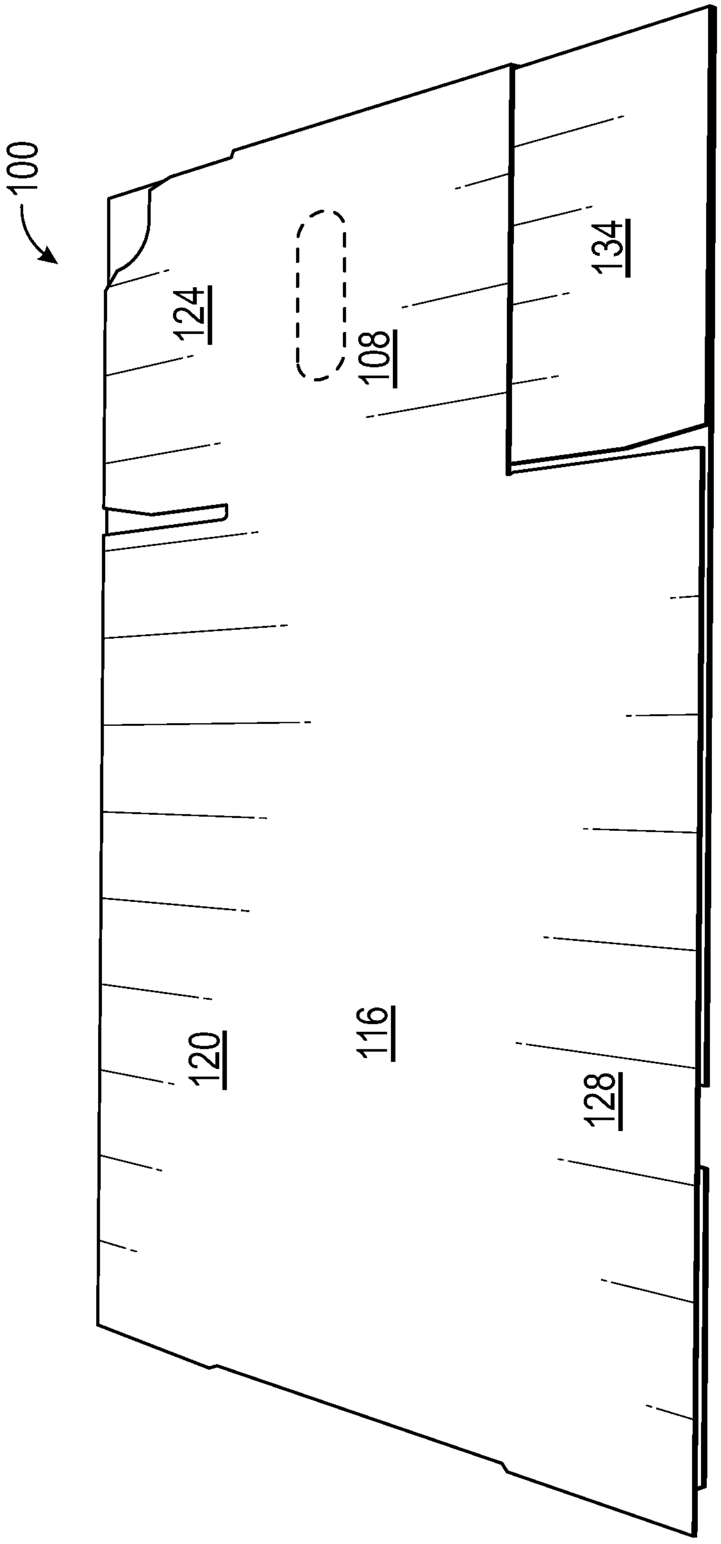
FIG. 4 illustrates an exemplary blank folded into a KDF blank.

FIG. 4 illustrates blank 100 folded from the first folded configuration (e.g., FIG. 3) to a second folded configuration. Glue strips 164, 166 (or other adhesive material) can secure third right side wall 106 to a surface of second right side wall 104, and third left side wall 112 to a surface of second left side wall 110.

Figure 5:
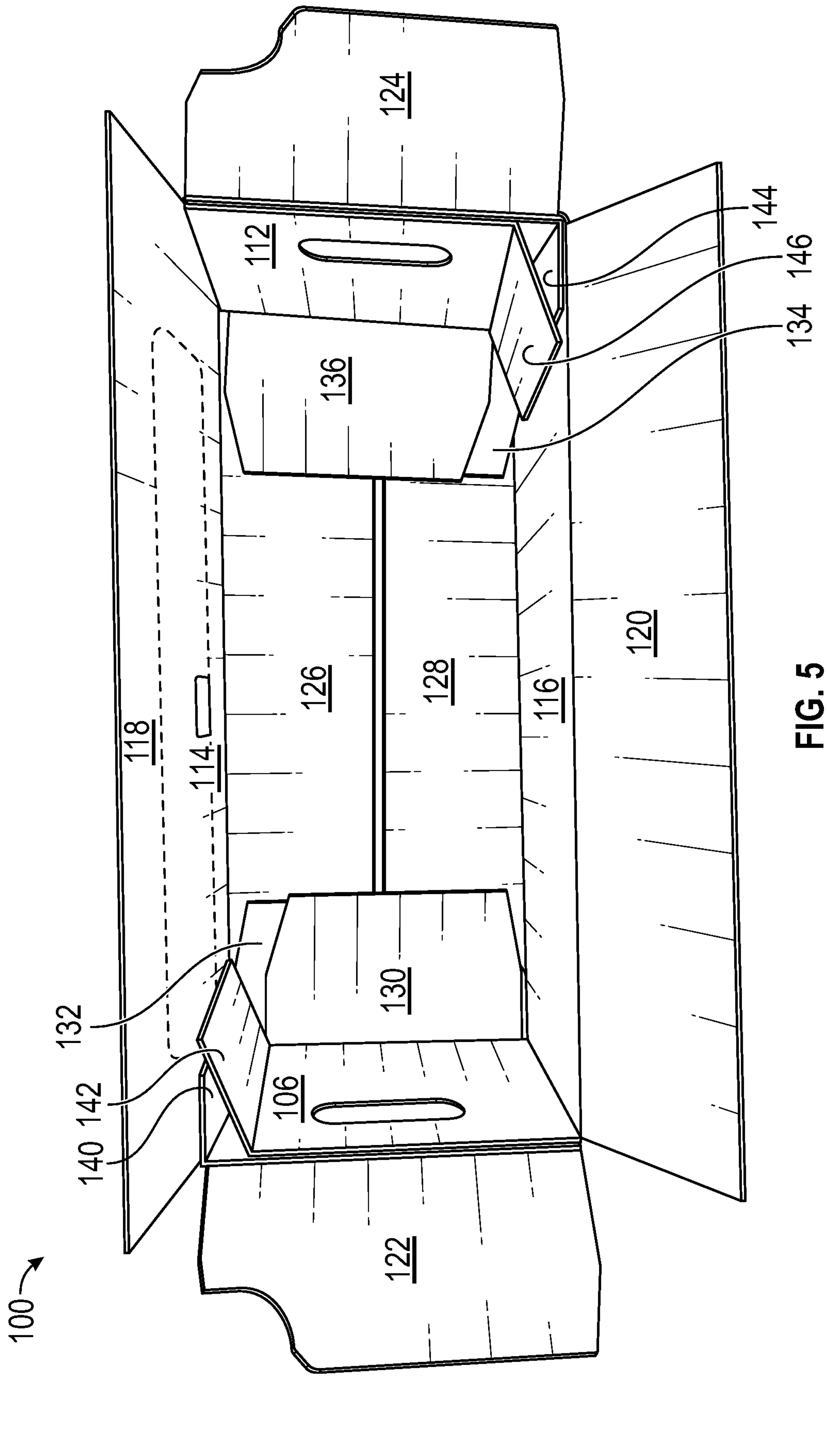
FIG. 5 illustrates an exemplary container formed from a blank.

FIG. 5 illustrates blank 100 converted to a constructed box (e.g., a shipping box). The constructed box is formed by moving the blank from the second folded configuration (e.g., FIG. 4) into a box shape with a plurality of adjacent walls on both sides of the box to provide greater structural strength. In addition, a plurality of flaps extend from the side walls to further strength the box.

Referring to FIG. 5, a right side of the box is collectively formed from first right side wall 102 (outermost wall), second right side wall 104 (intermediate wall), and third right side wall 106 (inner wall). In addition, the flaps (140, 142) that extend from the second and third right side walls (104, 106) extend at an angle from the respective walls. In some embodiments, the one or more flaps can generally extend in the direction of the adjacent wall (e.g., front wall 114). The width of the flaps can vary. For example, FIGS. 1 and 5 show an inner flap that is wider than the adjacent flap that extends from the intermediate side wall (e.g., second right side wall 104).

As shown in FIG. 5, first flap 140 and second flap 142 can, in some embodiments, contact the front wall 114. In some embodiments, the innermost flap (second flap 142) can be configured to contact less of the front wall and/or to extend at a larger angle than the first flap 140. For example, first flap 140 can extend at approximately 90 degrees relative to the structure from which it extends and second flap 142 can extend at an angle greater than 90 degrees (e.g., between 90 degrees and 110 degrees such as 95 degrees, 100 degrees, 110 degrees).

Similarly, a left side of the box is collectively formed from multiple side walls, including first left side wall 108 (outermost wall), second left side wall 110 (intermediate wall), and third right side wall 112 (inner wall). In addition, the flaps (144, 146) that extend from the second and third left side walls (110, 112) extend at an angle from the respective walls, such as along the rear wall 116.

In some embodiments, third flap 144 and fourth flap 144 can contact the rear wall 116. As discussed above with first and second flaps, the innermost flap can be configured to contact less of the front wall and/or to extend at a larger angle than the other flap. For example, third flap 144 can extend at approximately 90 degrees relative to the structure from which it extends and fourth flap 146 can extend at an angle greater than 90 degrees (e.g., between 90 degrees and 110 degrees such as 95 degrees, 100 degrees, 110 degrees).

In some embodiments, alternatively or additionally, a plurality of walls can be provided in other locations. For example, as shown in FIG. 5, the right side bottom wall can be defined by more than one wall such as right side bottom walls 130, 132, and the left side bottom wall can be defined by more than one wall such as left side bottom walls 134, 136.

Figure 6:
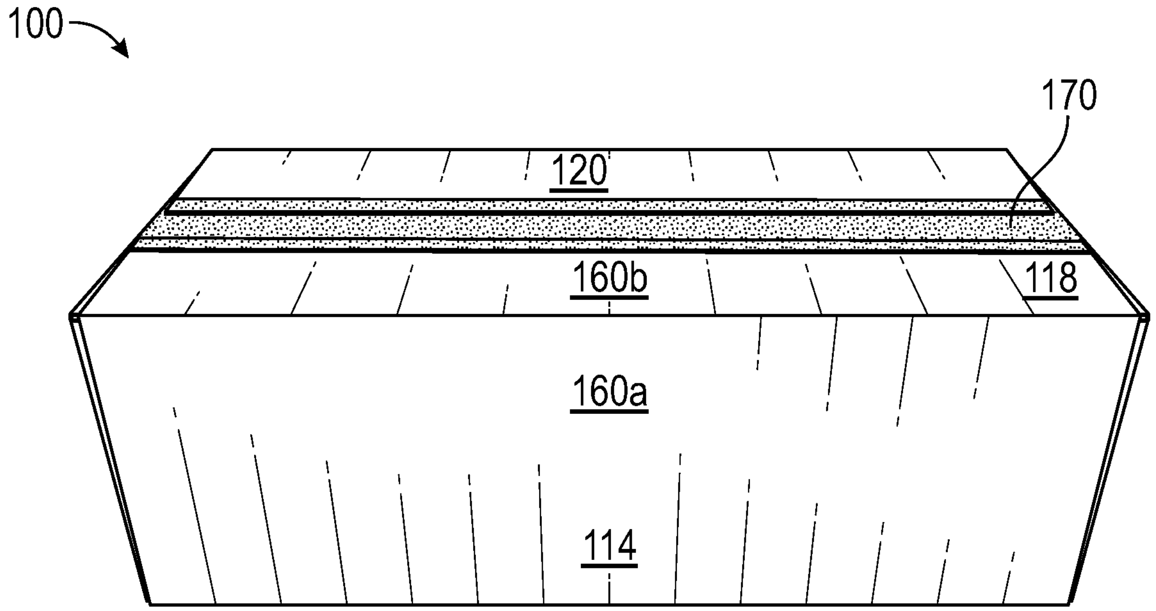
FIG. 6 illustrates an exemplary container formed from a blank and closed.

FIG. 6 illustrates the container of FIG. 5 in a closed configuration. As shown in FIG. 6, tape 170 can be used to secure one or more wall portions of the container. Additional securing means including fasteners, adhesive strips, glue, etc., can also be used to secure portions of the container at other locations, including to secure the first and second top/bottom side wall members together in a closed manner.

Figure 7:
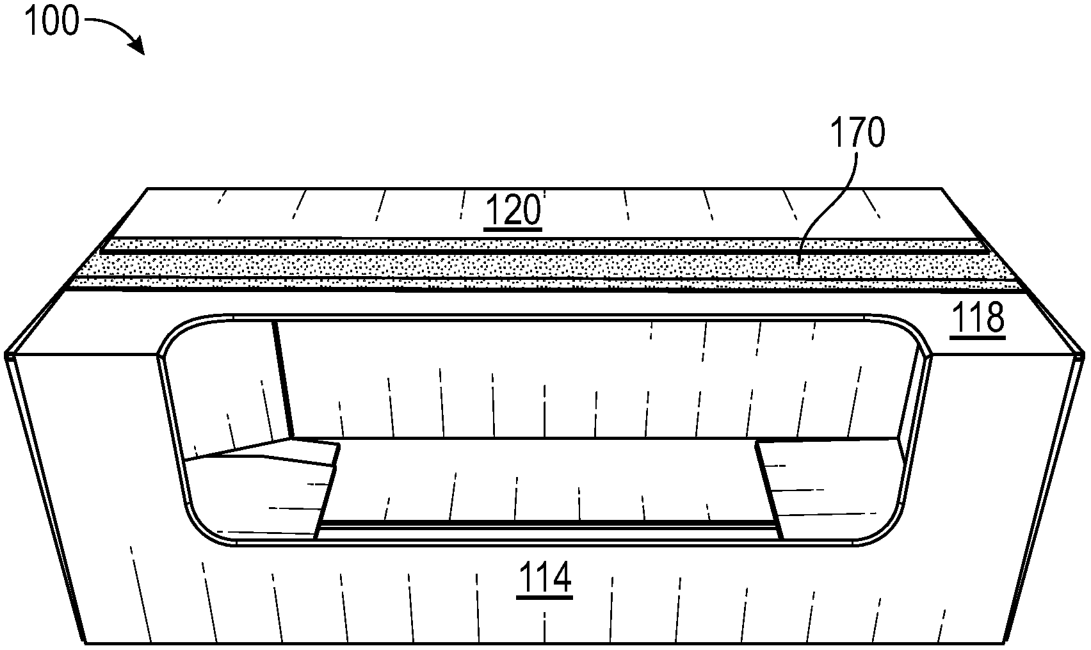
FIG. 7 illustrates the exemplary container of FIG. 6 after the removal of one or more removable panels.

FIG. 7 illustrates the container of FIG. 6 converted to a display box by removing removable panels **160*a* and 160*b* from the front wall 114 and front top wall 118**, creating an opening that extends from the front wall structure to the top wall structure.

Figure 8:
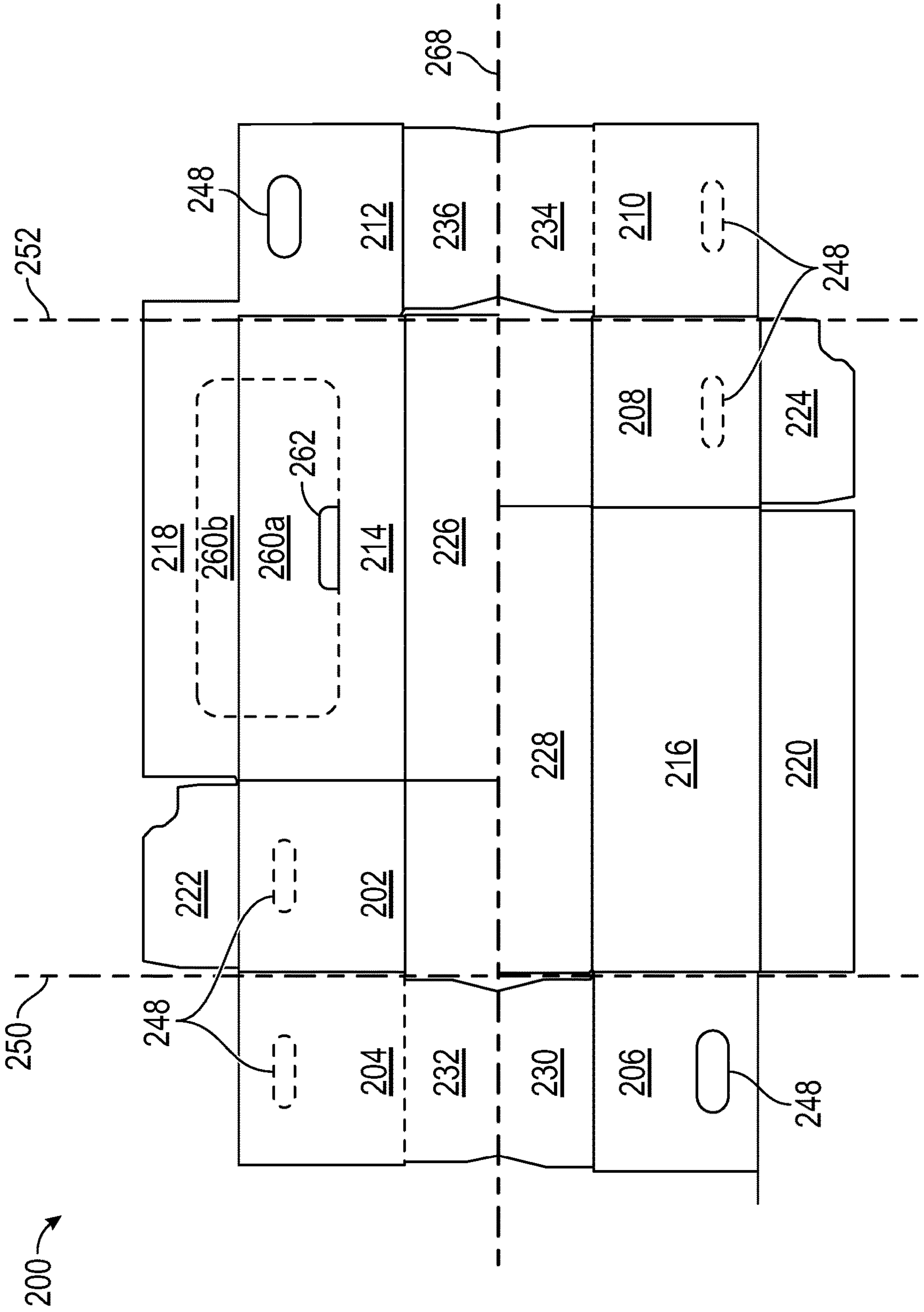
FIG. 8 illustrates a first side of an exemplary blank for constructing a container.
Figure 9:
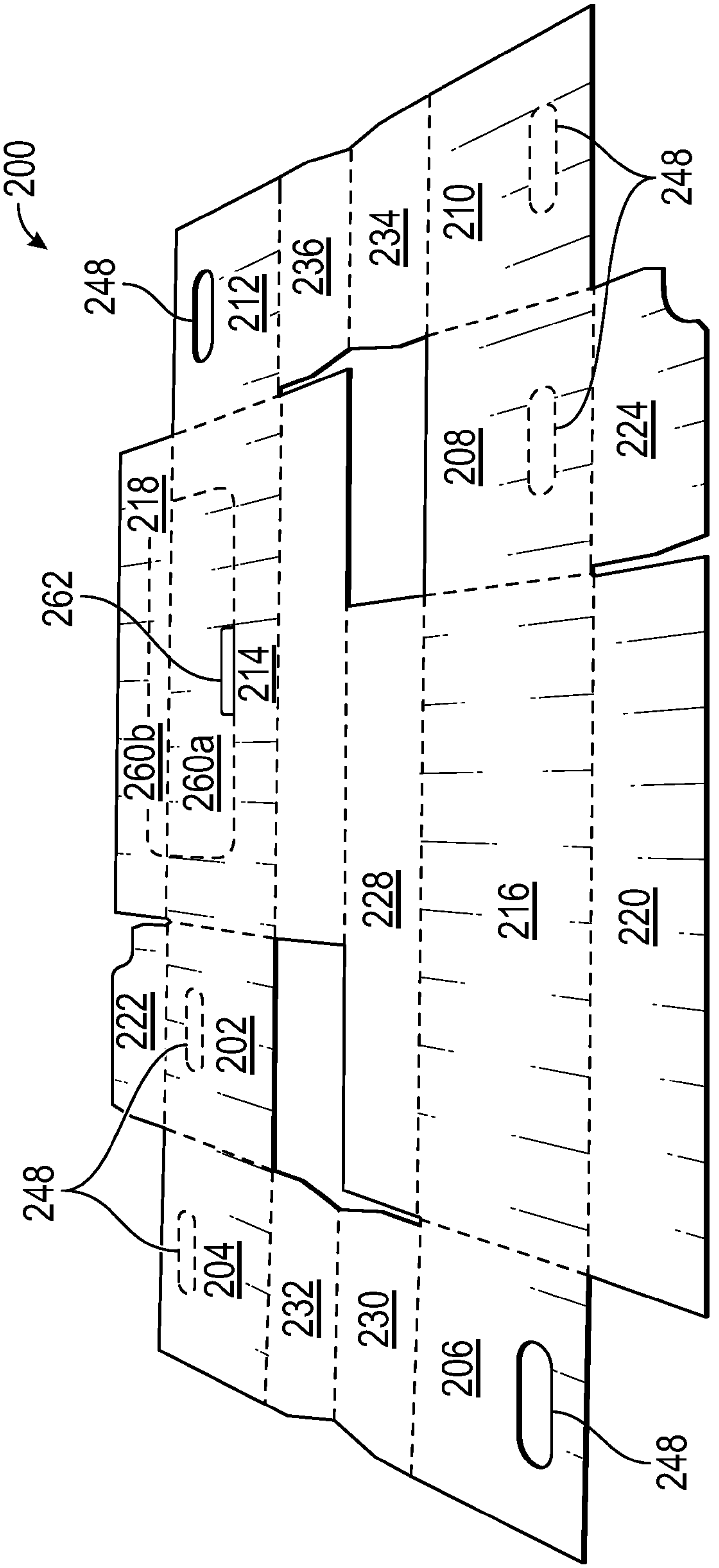
FIG. 9 illustrates a first side of an exemplary blank for constructing a container.

FIGS. 8 and 9 illustrates another exemplary embodiment of a blank 200 that can be formed into a container, such as a corrugated paperboard box. A first side of the blank (i.e., a top side) faces up and a second side (i.e., a bottom side) faces down. Like blank 100, blank 200 can be constructed into a container that comprises a plurality of side walls that provide improved structural integrity, including improved stacking strength. Blank 200 is similar to blank 100; however, the internal flaps described above are omitted.

For convenience, similar reference numbers have been used in different embodiments to refer to parts that are similar or identical in structure and/or function. Unless otherwise illustrated and/or discussed, similar or identical structures have the same purpose and the disclosure of an element in one embodiment also discloses a similar/identical element in another embodiments.

Blank 200 has a first right side wall 202, a second right side wall 204, a third right side wall 206, a first left side wall 208, a second left side wall 210, and a third left side wall 212. Blank 200 also includes a front wall 214, a rear wall 216, a front side top wall 218, a rear side top wall 220, a right side top wall 222, and a left side top wall 224. Blank 200 also includes a front side bottom wall 226, a rear side bottom wall, 228, one or more right side bottom walls (e.g., 230, 232) and one or more left side bottom walls (e.g., 234, 236).

As with the previous embodiment, one or more cut lines can be provided to facilitate the removal of portions of the blank, either during or after construction, such as one or more handle portions 248 and one or more removable panels (e.g., **260*a* and 260*b***).

In constructing the container, blank 200 can be folded about first fold lines 250, 252 in a manner similar to that described above with respect to blank 100, and adhesive or other securing members can be applied when forming the blank 200 into the first folded configuration (e.g., FIG. 3).

Figure 10:
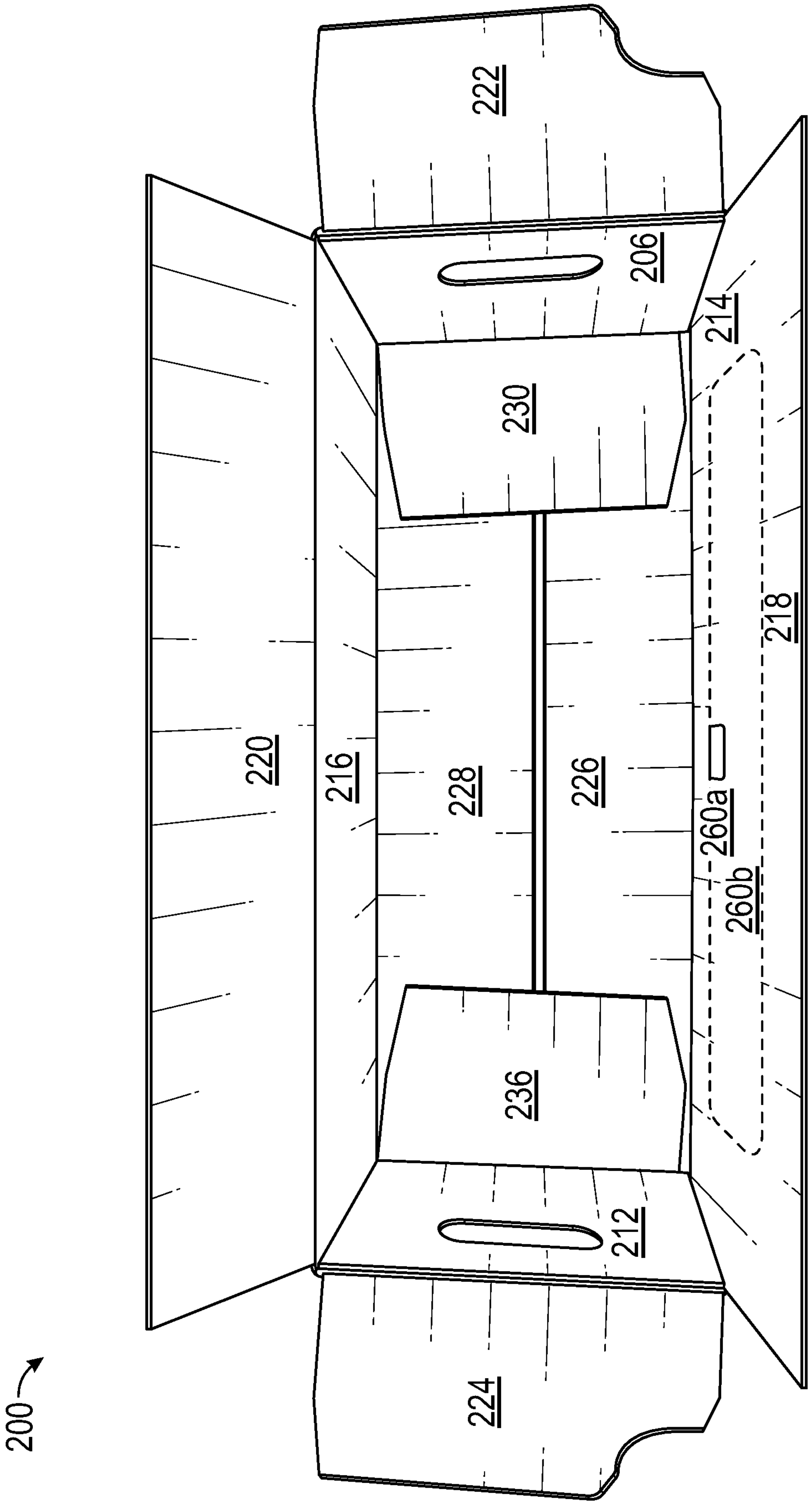
FIG. 10 illustrates an exemplary container formed from a blank.

FIG. 10 illustrates blank 200 converted to a constructed box (e.g., a shipping box). The constructed box is formed by moving the blank from the second folded configuration (e.g., FIG. 4) into a box shape with a plurality of adjacent walls on both sides of the box to provide greater structural strength.

Referring to FIG. 10, a right side of the box is collectively formed from first right side wall 202 (outermost wall), second right side wall 204 (intermediate wall), and third right side wall 206 (inner wall). Similarly, the left side of the box is collectively formed from multiple side walls, including first left side wall 208 (outermost wall), second left side wall 210 (intermediate wall), and third right side wall 212 (inner wall).

In some embodiments, alternatively or additionally, a plurality of walls can be provided in other locations. For example, the right side bottom wall can be defined by more than one wall such as right side bottom walls 230, 232 (not visible in FIG. 10), and the left side bottom wall can be defined by more than one wall such as left side bottom walls 234 (not visible in FIG. 10), 236.

The container of FIG. 10 can be closed in the same manner as described above (e.g., as shown in FIG. 6), and converted to a display box in the same manner as described above (e.g., as shown in FIG. 7).

Figure 11:
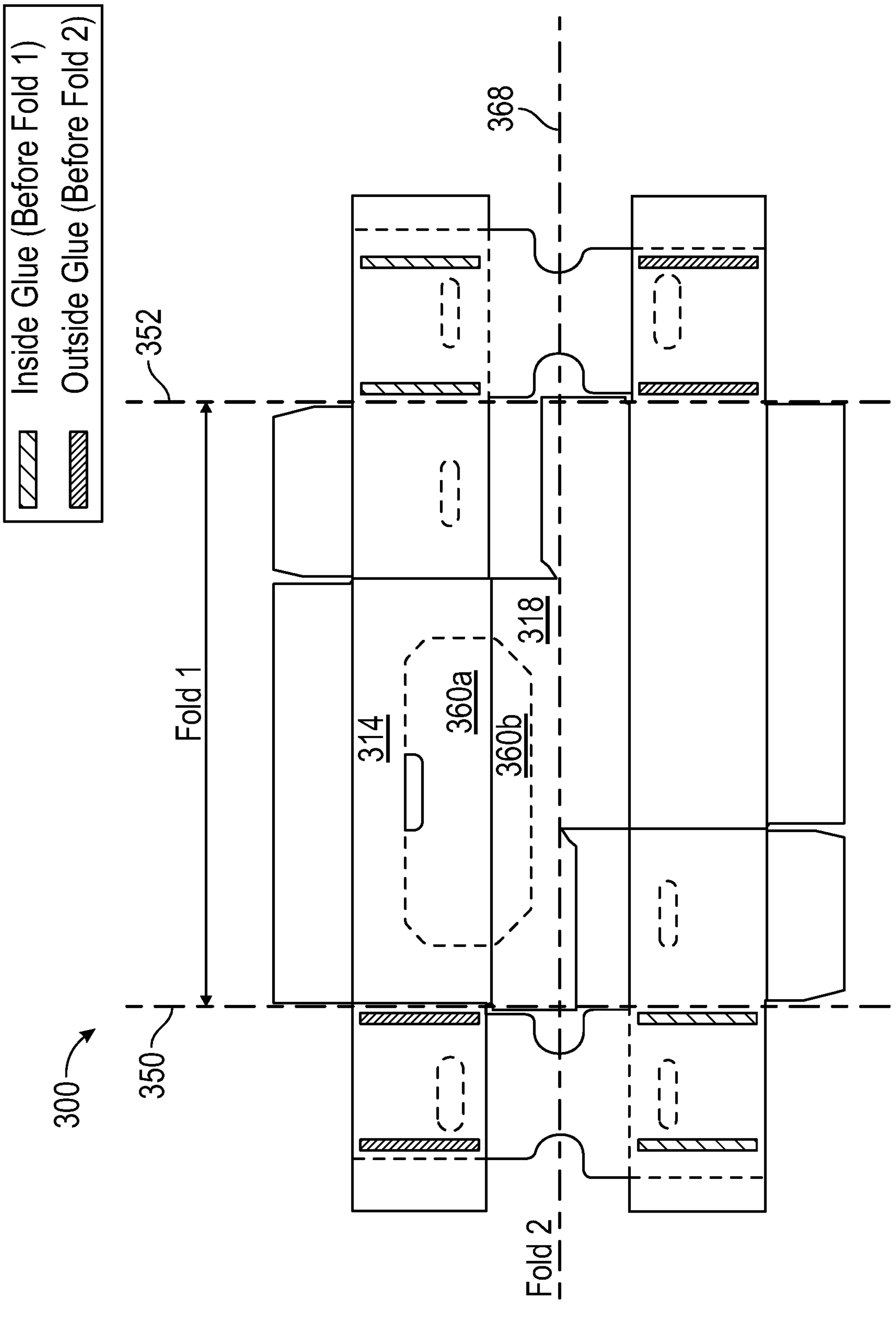
FIG. 11 illustrates another exemplary blank for constructing a container.

FIG. 11 illustrates another exemplary embodiment in which the window is oriented towards the center of the drawing so that hinge (e.g., a fold line) ends up at the top of the case. For example, in constructing the container, blank 300 can be folded about first fold lines 350, 352, as described elsewhere herein, into a first folded configuration. From that configuration, the box can be folded about a second fold line 368 into a second folded configuration. Construction of the box can be completed by moving the blank from the second folded configuration into a box shape with a plurality of adjacent walls on certain sides of the box to provide greater structural strength. The container can be then converted to a display box by removing removable panels **360*a* and 360*b* from the front wall 314 and front top wall 318**, creating an opening that extends from the front wall structure to the top wall structure.

Figure 12:
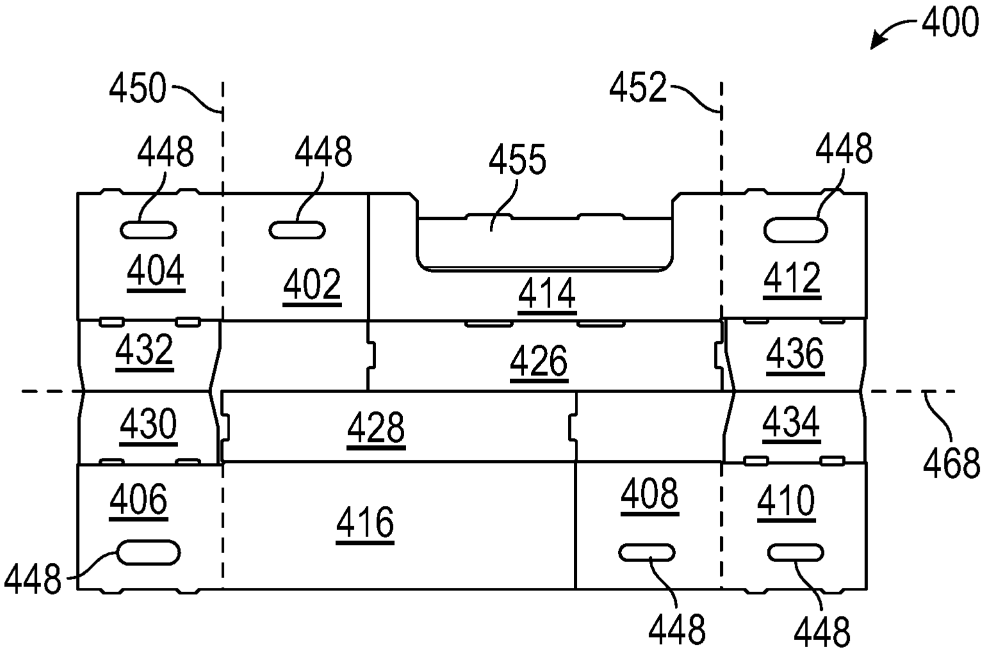
FIG. 12 illustrates a first side of an exemplary blank for constructing a container.

FIG. 12 illustrates another exemplary embodiment of a blank 400 that can be formed into a container, such as a corrugated paperboard box. A first side of the blank (i.e., a top side) faces up and a second side (i.e., a bottom side) faces down. Like the other blanks described herein, blank 400 can be constructed into a container that comprises a plurality of side walls that provide improved structural integrity, including improved stacking strength. Blank 400, however, does not include a lid (e.g., top walls). Providing a blank that does not have top walls results in an open top construction can be suitable for certain display purposes where a top cover (e.g., lid) is not desired; however, improved stacking strength and structure (as provided by the plurality of side walls) is needed.

For convenience, similar reference numbers have been used in different embodiments to refer to parts that are similar or identical in structure and/or function. Unless otherwise illustrated and/or discussed, similar or identical structures have the same purpose and the disclosure of an element in one embodiment also discloses a similar/identical element in another embodiments.

Blank 400 has a first right side wall 402, a second right side wall 404, a third right side wall 406, a first left side wall 408, a second left side wall 410, and a third left side wall 412. Blank 400 also includes a front wall 414, and a rear wall 416. Blank 400 also includes a front side bottom wall 426, a rear side bottom wall, 428, one or more right side bottom walls (e.g., 430, 432) and one or more left side bottom walls (e.g., 434, 436). A rollover front lip 455 can also be provided if desired to provide improved durability. Rollover front lip 455 is configured to be folded down so that the rollover front lip 455 is adjacent a portion of front wall 414 when constructed.

As with the previous embodiment, one or more cut lines can be provided to facilitate the removal of portions of the blank, either during or after construction, such as one or more handle portions 448.

Figure 14:
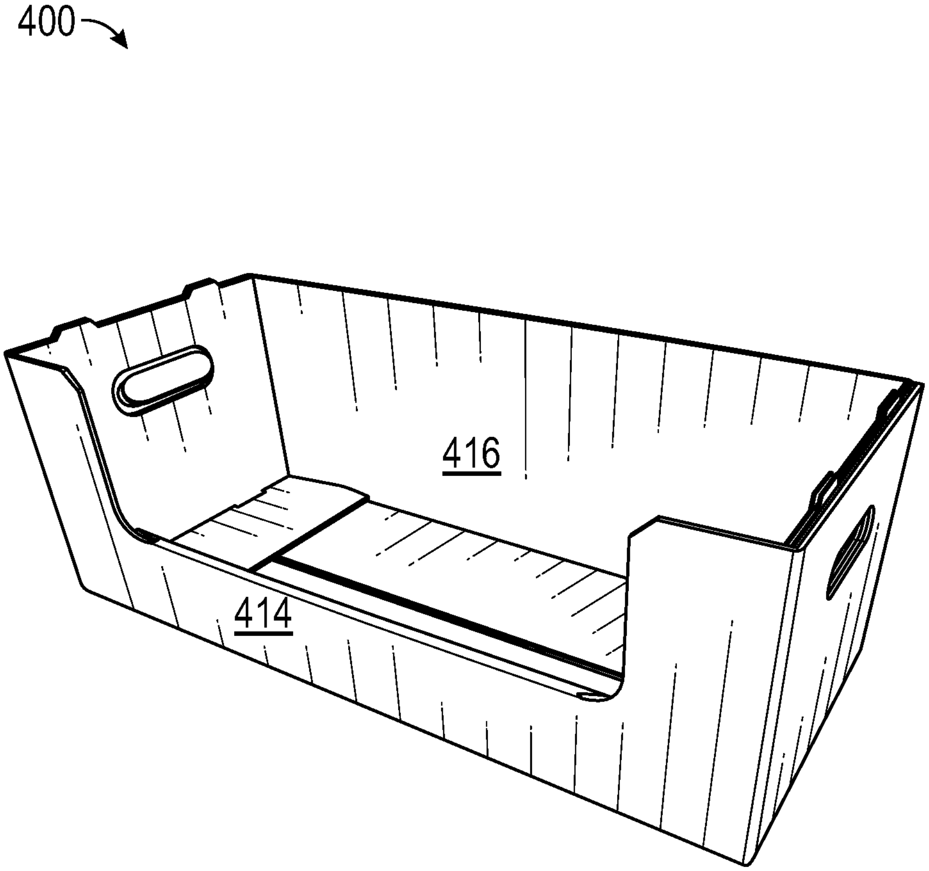
FIG. 14 illustrates an exemplary container formed from a blank.

In constructing the container, blank 400 can be folded about first fold lines 450, 452 in a manner similar to that described above with respect to blanks 100 and 200, and adhesive or other securing members can be applied when forming the blank 400 into the first folded configuration (e.g., as shown in FIG. 3). FIG. 14 shows blank 400 constructed into a container that does not have a lid.

Figure 13:
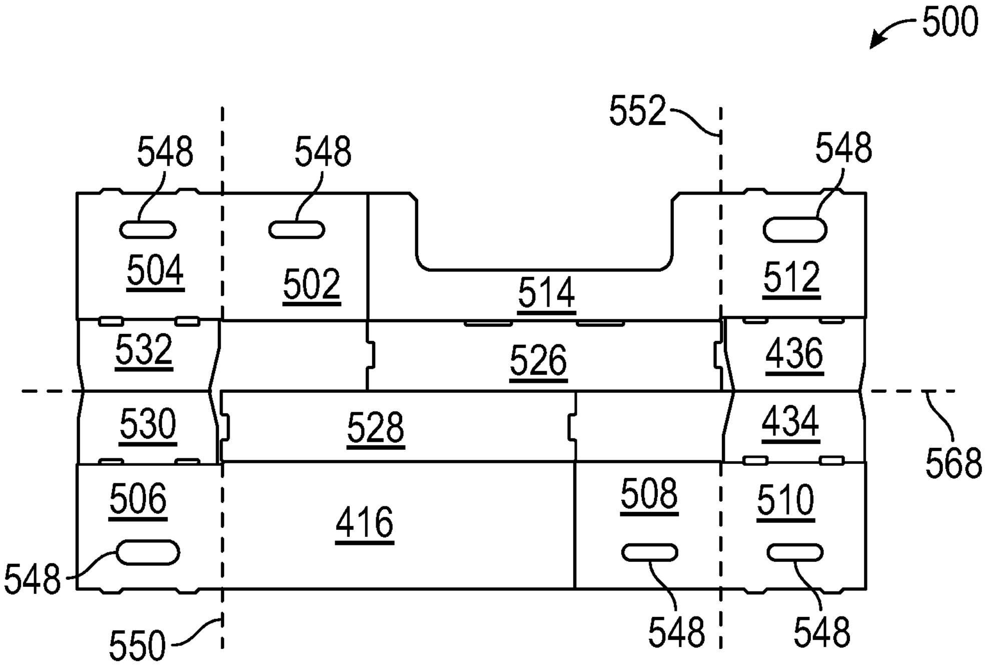
FIG. 13 illustrates a first side of an exemplary blank for constructing a container.

FIG. 13 illustrates another exemplary embodiment of a blank 500 that can be formed into a container, such as a corrugated paperboard box. A first side of the blank (i.e., a top side) faces up and a second side (i.e., a bottom side) faces down. Like the other blanks described herein, blank 500 can be constructed into a container that comprises a plurality of side walls that provide improved structural integrity, including improved stacking strength. Like blank 400, blank 500 does not include a lid (e.g., top walls). In addition, blank 500 is different from blank 400 in that there is no rollover front lip.

For convenience, similar reference numbers have been used in different embodiments to refer to parts that are similar or identical in structure and/or function. Unless otherwise illustrated and/or discussed, similar or identical structures have the same purpose and the disclosure of an element in one embodiment also discloses a similar/identical element in another embodiments.

Blank 500 has a first right side wall 502, a second right side wall 504, a third right side wall 506, a first left side wall 508, a second left side wall 510, and a third left side wall 512. Blank 500 also includes a front wall 514, and a rear wall 516. Blank 500 also includes a front side bottom wall 526, a rear side bottom wall, 528, one or more right side bottom walls (e.g., 530, 532) and one or more left side bottom walls (e.g., 534, 536).

The containers disclosed herein provide significant benefits over conventional containers, including, for example, by providing retail ready packaging (e.g., removable panels) with sufficient stacking strength to support higher loads than conventional containers. In addition, in some embodiments and with certain equipment, the blanks disclosed herein can be folded and glued on a single piece of equipment, simplifying manufacture.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A corrugated fiberboard container comprising:

an exterior portion comprising a front wall, a rear wall, a first left side wall, a first right side wall, and a bottom section;

a second right side wall positioned adjacent the first right side wall;

a third right side wall positioned adjacent the second right side wall;

a second left side wall positioned adjacent the first left side wall;

a third left side wall positioned adjacent the second left side wall; and a first flap that extends from the second right side wall;

a second flap that extends from the third right side wall;

a third flap that extends from the second left side wall; and a fourth flap that extends from the third left side wall.

2. The corrugated fiberboard container of claim 1, wherein at least one of the first flap and the second flap extends in a direction of the front wall and/or the rear wall.

3. The corrugated fiberboard container of claim 1, wherein the first flap, the second flap, the third flap, and the fourth flap extend from their respective side walls at an angle of between 90 and 110 degrees.

4. The corrugated fiberboard container of claim 1, wherein the first and second flaps are the same width, and the third and fourth flaps are the same width.

5. The corrugated fiberboard container of claim 1, wherein the first and second flaps have different widths, and the third and fourth flaps have different widths.

6. The corrugated fiberboard container of claim 1, further comprising a top section and at least one removable panel that defines an opening, upon removal, that extends from the first front wall to the top section.

7. The corrugated fiberboard container of claim 1, wherein the first left side wall is secured to the second left side wall, the third left side wall is secured to the second left side wall, the first right side wall is secured to the second right side wall, and the third left side wall is secured to the second right side wall.

8. A corrugated fiberboard container comprising:

an exterior portion comprising a front wall, a rear wall, a first left side wall, a first right side wall, and a bottom section;

a second right side wall positioned adjacent the first right side wall;

a third right side wall positioned adjacent the second right side wall;

a second left side wall positioned adjacent the first left side wall;

a third left side wall positioned adjacent the second left side wall;

at least one right flap that extends from at least one of the second right side wall and the third right side wall along one of the front wall or the rear wall;

at least one left flap that extends from at least one of the second left side wall and the third left side wall along the other one of the front wall or the rear wall.

9. The corrugated fiberboard container of claim 8, wherein the at least one right flap and the at least one left flap extend from their respective side walls at an angle of between 90 and 110 degrees.

10. The corrugated fiberboard container of claim 8, wherein the at least one right flap comprises a first flap that extends from the second right side wall and a second flap that extends from the third right side wall, and wherein the at least one left flap comprises a third flap that extends from the second left side wall and a fourth flap that extends from the third left side wall.

11. The corrugated fiberboard container of claim 10, wherein the first and second flaps are the same width, and the third and fourth flaps are the same width.

12. The corrugated fiberboard container of claim 10, wherein the first and second flaps have different widths, and the third and fourth flaps have different widths.

13. The corrugated fiberboard container of claim 8, further comprising a top section and at least one removable panel that defines an opening, upon removal, that extends from the first front wall to the top section.

14. The corrugated fiberboard container of claim 8, wherein the first left side wall is secured to the second left side wall, the third left side wall is secured to the second left side wall, the first right side wall is secured to the second right side wall, and the third left side wall is secured to the second right side wall.

15. The corrugated fiberboard container of claim 8, wherein the front wall, a rear wall, second and third left side walls, a second and third right side walls define four internal edges of the corrugated fiberboard container, and the at least one right flap and the at least one left flap extend from opposite ones of the four internal edges.

* * * * *